United States Patent [19]

Santefort et al.

[11] Patent Number: 4,486,001
[45] Date of Patent: Dec. 4, 1984

[54] AIR ACTUATED FLUID CONTROL VALVE WITH FLUID SUPPORTED DIAPHRAGM

[75] Inventors: Richard A. Santefort, Hamilton; Edmund Neckel, Cincinnati, both of Ohio

[73] Assignee: Valco Cincinnati, Inc., Cincinnati, Ohio

[21] Appl. No.: 400,889

[22] Filed: Jul. 22, 1982

[51] Int. Cl.³ .......................................... F16K 31/365
[52] U.S. Cl. .................................... 251/61.3; 92/6 D; 92/99
[58] Field of Search ....................... 251/61.3, 61, 61.2, 251/61.4, 61.5, 60, 284; 92/98 R, 99, 100, 143, 8, 101, 6 D; 91/394, 395, 396, 409

[56] References Cited

U.S. PATENT DOCUMENTS 268,594  12/1882  Aikman et al. ...................... 137/118

FOREIGN PATENT DOCUMENTS 1476112  9/1969  Fed. Rep. of Germany ..... 251/61.3

Primary Examiner—Martin P. Schwadron
Assistant Examiner—John S. Starsiak, Jr.
Attorney, Agent, or Firm—Frost & Jacobs

[57] ABSTRACT

An air actuated adhesive application control valve using a resilient diaphragm to control reciprocation of the valve stem. Unsupported portions of the diaphragm are supported by a layer of the incompressible adhesive trapped within a fluid cavity adjacent one major surface of the diaphragm. Adhesive is permitted to enter the fluid cavity when the valve is in the closed position, but is prevented from escaping therefrom by a separate valve mechanism carried by the valve stem when the valve is in the opened position. The second valve element also serves as a stop to limit travel of the reciprocating stem, thereby controlling the valve opening clearance.

11 Claims, 4 Drawing Figures

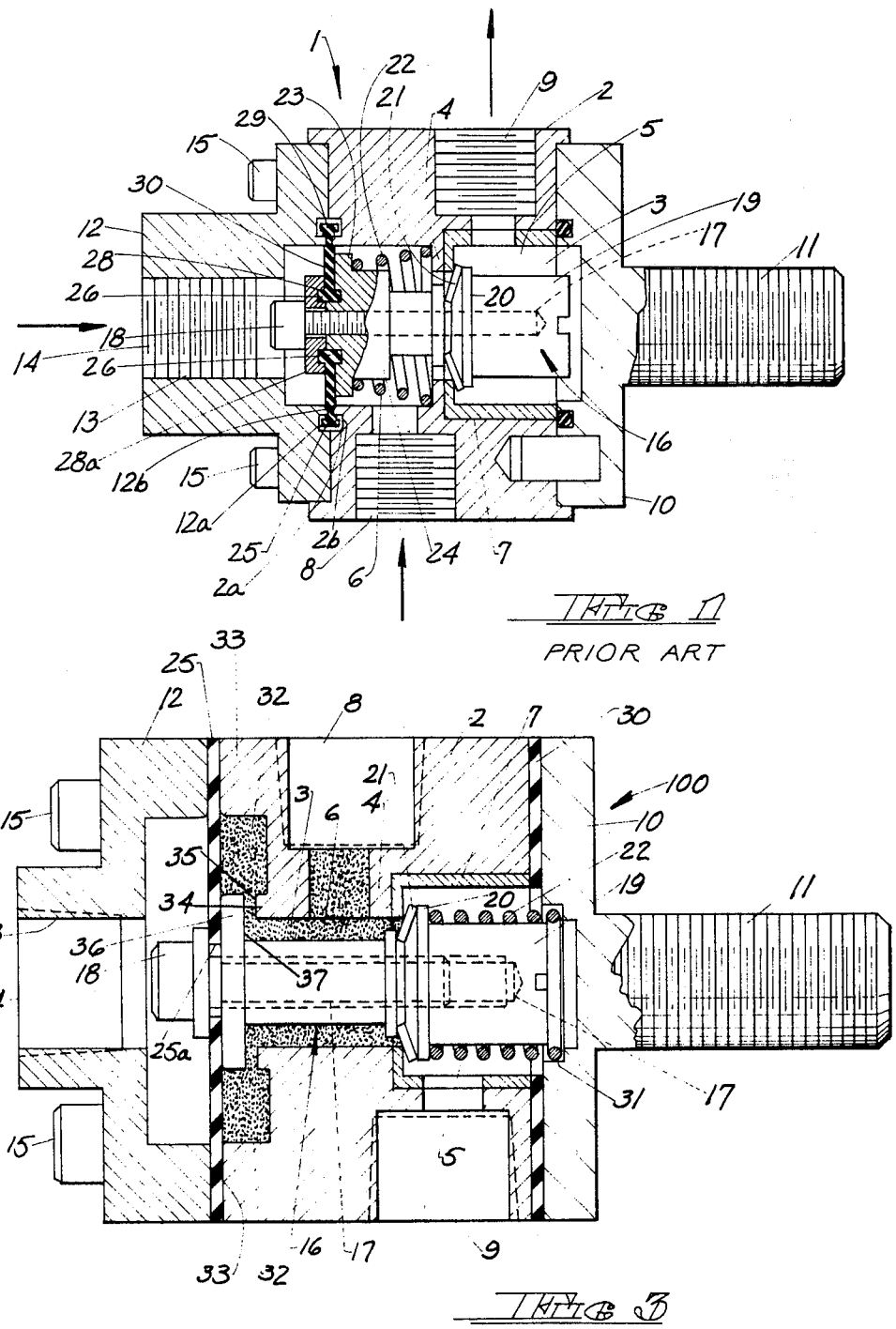

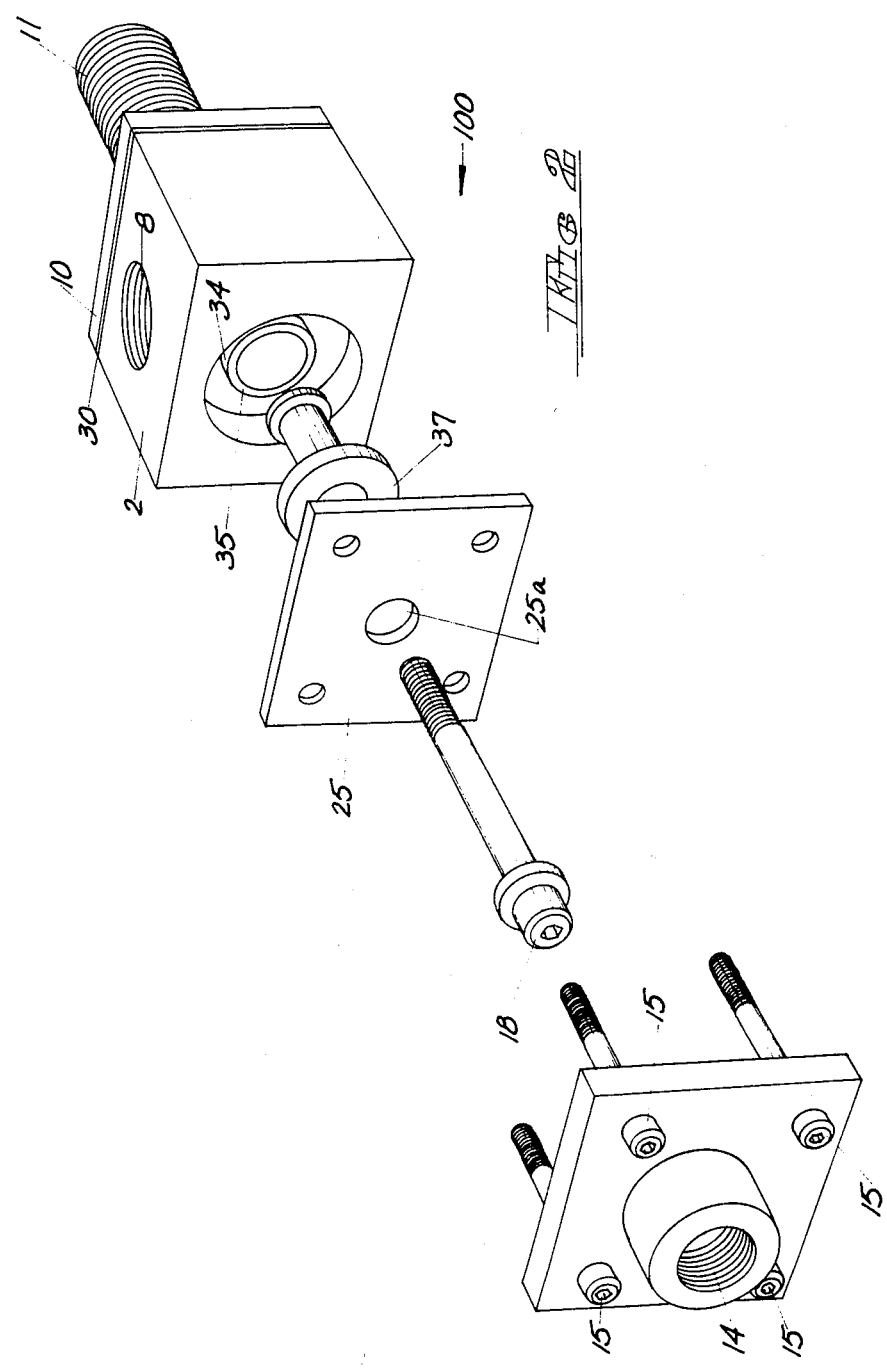

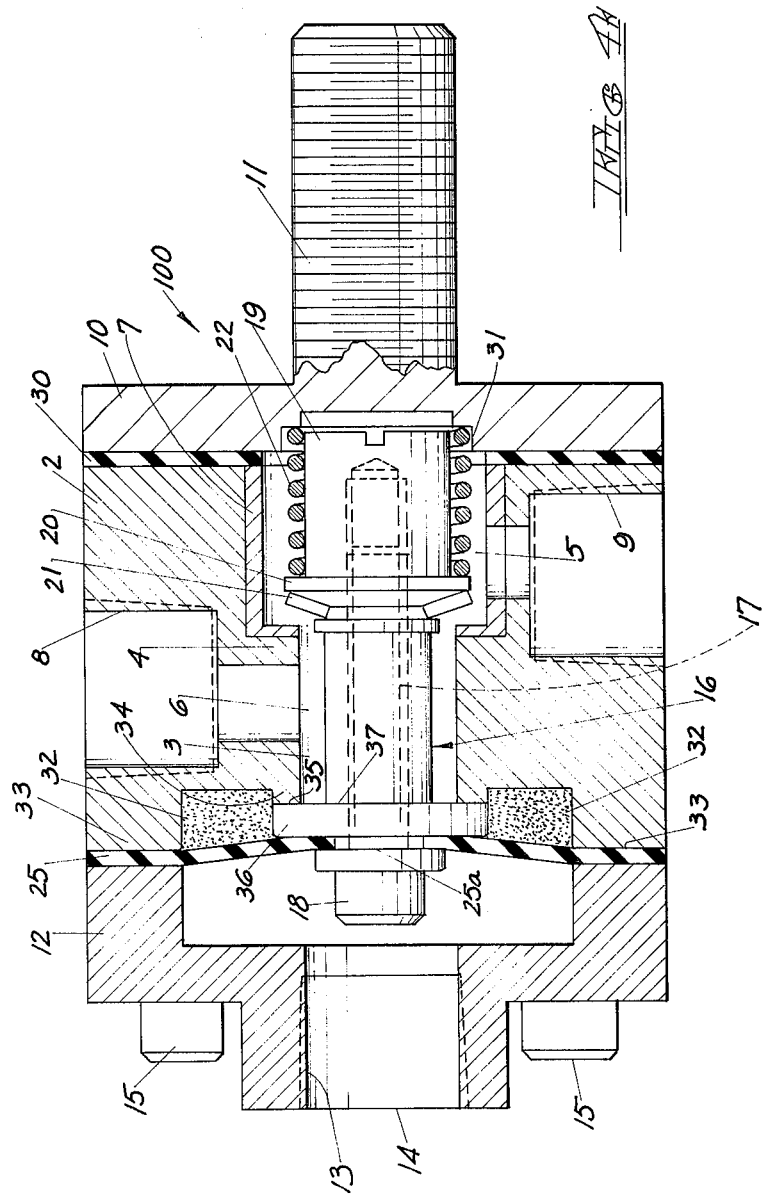

AIR ACTUATED FLUID CONTROL VALVE WITH FLUID SUPPORTED DIAPHRAGM

SUMMARY OF THE INVENTION

The present invention is directed to an air actuated fluid control valve especially one of the type for controlling the flow of liquid adhesive, and more particularly to a valve in which unsupported portions of the actuating diaphragm are supported by means of an incompressible fluid retained in an annular chamber abutting the rear surface of the diaphragm.

In the application of adhesives to boxboard and the like, a pneumatically operated fluid control valve is often used as a flow controller to insure that the adhesive is applied at the proper time and to the proper position on the boxboard.

One type of valve commonly used includes a body portion with an interior longitudinally extending bore having an adhesive inlet for admitting adhesive into the inlet chamber, and an outlet for exhausting adhesive to the application device from the outlet chamber.

Adhesive flow is controlled by a valve stem which is mounted for reciprocating motion within the bore. One end of the valve stem forms a seating arrangement which prevents flow of adhesive between the inlet and the outlet chambers when the stem is in the closed position, while permitting flow of adhesive between these chambers when the stem is in the opened position.

The other end of the valve stem mounts a resilient flexible annular diaphragm, and generally is designed with a central web portion surrounded by a thicker peripheral bead.

When air pressure is applied to one major surface of the diaphragm, it deflects, thereby moving the valve stem to which the diaphragm is connected to open the valve and permit the flow of adhesive therethrough. When air pressure on the major surface of the diaphragm is released, a cone spring returns the valve stem and diaphragm to the closed position.

In fluid control valves of this type, the outer peripheral bead of the diaphragm is clamped between cooperating mating portions of the valve body. The valve stem passes through an opening in the center of the diaphragm, and is fixedly attached thereto. This type of construction requires that a significant portion of the diaphragm, particularly, the web portion of the diaphragm, is unsupported and therefore free to deflect when air pressure is applied.

Under some circumstances, this deflection can result in high stress forces in the diaphragm web which may lead to premature diaphragm failure. In addition, the opposite major surface of the diaphragm is often directly in contact with the adhesive or other fluid within the outlet chamber. The deflection of the diaphragm causes displacement of the adhesive in this chamber, resulting in a pulse or surge of adhesive through the valve. This condition can result in unsatisfactory adhesive cut-offs characteristics at the application device and disrupts precise control of the amount of adhesive applied to the boxboard.

In prior art valve constructions, over deflection of the diaphragm may also be caused by unprecise control of mechanical stops which limit valve stem travel. For example, in some type of valves, physical contact between the bottom of the valve stem and an interior surface of the valve body is relied upon to limit reciprocating movement of the stem in order to control the amount of valve clearance when the valve is in the open position. In some instances, the manufacturing tolerances associated with these elements cannot be closely controlled, thereby resulting in over extension of the diaphragm and over- or under-opening of the valve.

The present invention provides an improvement in valves of this type in which the normally unsupported surfaces of the diaphragm are supported or backed up by a layer of incompressible fluid retained in a valve cavity. This incompressible fluid (which may be a portion of the liquid adhesive itself) is retained in a closed cavity so as to resist deflection of the diaphragm caused by air pressure on the opposite major surface of the diaphragm.

In addition, the present invention provides improved means for controlling the opening clearances and limiting deflection of the diaphragm by providing a positive stop. In the preferred embodiment described, this stop takes the form of an auxiliary seating surface which also serves to prevent escape of the incompressible fluid from within the cavity backing up the diaphragm.

Further features of the invention will become apparent from the detailed description which follows:

BRIEF DESCRIPTION OF THE DRAWING

FIG. 1 is fragmentary cross sectional side elevation view of a prior art air actuated fluid control valve.

FIG. 2 is a fragmentary exploded perspective view of the improved valve construction of the present invention.

FIG. 3 is a fragmentary cross sectional side elevational view of the improved valve construction of the present invention with the valve elements in the closed position.

FIG. 4 is a fragmentary cross sectional side elevational view of the improved valve construction of the present invention with the valve elements in the opened position.

DETAILED DESCRIPTION

A typical prior art air pressure controlled adhesive application valve is illustrated generally at 1 in FIG. 1. The valve, which may be constructed of brass or other suitable corrosion resistant material, includes a generally cylindrical body portion 2 having a longitudinal bore 3 extending therethrough. A circumferentially extending shoulder 4 extend inwardly at approximately the mid-point of bore 3 to form a seating surface.

The section of bore 3 located on one side of shoulder 4 forms an adhesive outlet chamber 5, while the region of bore 3 located on the opposite side of shoulder 4 forms an adhesive inlet chamber 6. A press-fitted corrosion resistant insert 7 may be provided within adhesive outlet chamber 5.

A transversely extending inlet port 8 is provided for admitting adhesive into inlet chamber 6, while a transversely extending outlet port 9 located on the opposite side of body 2 is provided for exhausting adhesive from outlet chamber 5 to a suitable adhesive application device, not illustrated.

As viewed in FIG. 1, the right-hand side of bore 3 is closed by a lower retainer 10 and a threaded stud 11 for mounting the valve to a suitable support structure, not shown. The opposite end of bore 3 is closed by a generally cylindrical pilot inlet 12 having a longitudinally extending bore 13 therewithin. The outermost end of bore 13 forms an inlet 14 for admitting pressurized control air to the valve from an electrically actuated three-way valve or the like, not shown. Pilot inlet 12 may be connected to body 2 by screws, bolts or the like 15.

A valve stem assembly shown generally at 16 is mounted for reciprocating movement within bore 3. The stem assembly 16 includes a threaded stem bolt 17 having a headed portion 18 on one end. A cap-like stem top 19 is threadedly attached to one end of stem bolt 17 within adhesive outlet chamber 5. The innermost end of stem top 19 forms an outwardly extending flange 20 which cooperates with shoulder 4 to form a seat. Additional sealing is provided by an annular resilient sealing member 21.

Valve stem assembly 16 is urged to the closed position by helical cone spring 22 mounted coaxially with stem bolt 17. One end of spring 22 rests upon the outer surface of shoulder 4, while the other end of the spring is urged against the flange 23 extending outwardly from a stem bottom member 24 which threadedly engages stem bolt 17.

An annular-shaped flexible resilient diaphragm 25 is mounted coaxially on stem bolt 17. Diaphragm 25 may be constructed of any suitable adhesive resistant rubber, plastic or other resilient flexible material. The diaphragm contains a central opening 26 which is surrounded by a peripheral bead 28. The bead fits within cooperating grooves inscribed in the mating surfaces of stem bottom 24 and a cap member 28a. It will be observed that when the valve stem assembly is assembled, diaphragm 25 will be fixedly secured by the portion of the diaphragm immediately adjacent the central opening 26 so as to move with the stem assembly.

Diaphragm 25 is also provided with a bead portion 29 surrounding the outer peripheral edge. The surface of valve body 2 immediately adjacent pilot inlet 12 is provided with a circular counterbore 2a while the surface of pilot inlet 12 immediately adjacent the body portion is provided with a matching circular counterbore 12a. This produces similarly constructed shoulder portions 2b and 12b on the body and pilot inlet, respectively. The outer bead portion 29 of the diaphragm is configured to lie within the circular groove formed by the counterbores. When the metallic body and pilot inlet sections are mated together, a part of the web portion 30 of the diaphragm is squeezed between shoulder portions 2b and 12b, thereby restraining the diaphragm. As illustrated in FIG. 1, when the valve is in the closed position, spring 22 operates to urge the valve stem to the left, thereby forcing flange 20 against shoulder 4 to prevent the flow of adhesive from the adhesive inlet chamber to the adhesive outlet chamber. When air under pressure is applied to inlet 14, a force is exerted against the outer major surface of diaphragm 25, thereby forcing the entire valve stem assembly to the right as viewed in FIG. 1. This causes flange 20 to be disengaged from shoulder 4 to permit the unobstructed flow of adhesive from inlet port 8 to outlet port 9. It will be observed that when this occurs, a portion of diaphragm 25 is unsupported. In some cases, and particularly under conditions of very high air pressure, this unsupported part of the diaphragm may be overextended, thereby causing the diaphragm to deflect or sag excessively, which as described hereinabove may result in premature diaphragm failure. Furthermore, deflection of the unsupported part of diaphragm 25 may force a portion of the liquid adhesive within inlet chamber 6 into outlet chamber 5, thereby causing a pressure pulse or surge of adhesive at the application device.

As noted above, another drawback associated with some types of prior art valves is the amount of valve stem assembly travel permitted before the bottom surface of stem top 19 bottoms against the countersunk surface of lower retainer 10. If the tolerances of the valve assembly are not closely controlled, over extension of the diaphragm and/or unpredictable valve clearance opening between flange 20 and shoulder 4 may result.

An improved valve construction which obviates these problems is illustrated in the embodiment of FIG. 2–FIG. 4 where elements similar to those previously described have been similarly designated.

The improved valve construction, illustrated generally at 100, includes a body portion 2, which in the embodiment illustrated is of generally square cross section, although it will be understood that other unique and non-functional shapes may be used as desired, such as for identifying the manufacturing source of the valve. Body portion 2 includes a longitudinal bore 3 which extends therethrough, and includes a circumferentially extending shoulder 4 extending inwardly at approximately the mid-point of bore 3 to form a seating surface.

The section of bore 3 located to the right of shoulder 4 as illustrated in FIG. 3 and FIG. 4 forms an adhesive outlet chamber 5, while the region of bore 3 located on the opposite side of shoulder 4 forms an adhesive inlet chamber 6. A press-fitted corrosion resistant insert 7 may be provided within adhesive outlet chamber 5.

A transversely extending inlet port 8 is provided for admitting adhesive into inlet chamber 6, while a transversely extending outlet port 9 located on the opposite side of body 2 is provided for exhausting adhesive from outlet chamber 5 to an adhesive application device, not illustrated. Each of these inlets and outlets may be threaded to accept a conventional fitting, as desired.

The right-hand side of bore 3 is closed by a lower retainer 10 having a threaded stud 11 for mounting the valve to a suitable support structure, not illustrated. The opposite end of bore 3 is closed by a pilot inlet 12 having a longitudinally extending bore 13 therewithin which forms an inlet 14 for admitting pressurized control air to the valve. Lower retainer 10 and pilot inlet 12 may be securely fastened to body portion 2 by screws or the like 15. In addition, a resilient sealing gasket 30 may be provided between the cooperating mating surfaces of lower retainer 10 and body portion 2.

A valve stem assembly shown generally at 16 is mounted for reciprocating movement within bore 3 and includes a threaded stem bolt 17 having a headed portion 18 at one end. A cap-like stem top 19 is threadedly attached to one end of stem bolt 17 within adhesive outlet chamber 5. The interior-most end of stem top 19 forms an outwardly extending flange 20 which cooperates with shoulder 4 to form a seat. Additional sealing is provided by a resilient annular-shaped sealing member 21. It will be observed that the cooperation between flange 20 and shoulder 4 forms the actual valve means for permitting or preventing fluid flow between the inlet and outlet chambers, respectively.

A compression spring 22 surrounds stem top 19 and operates to urge the valve stem assembly to the closed position. One end of spring 22 rests against the outer surface of flange 20, while the other end of the spring rests against the bottom surface of a counterbore 31 provided in lower retainer 10.

The left-hand face of body portion 3 as viewed in FIG. 3 and FIG. 4 is provided with a centrally located counterbore which forms a generally annular-shaped cavity 32. The diameter of cavity 32 is dimensioned so that a land portion 33 remains around the outer edge of the valve body to support the outer periphery of a diaphragm 25. The innermost edge of counter bore 32 adjacent adhesive inlet chamber 6 is provided with a generally circular rib 34 which forms a smooth seating surface 35 on its upper surface.

In the present embodiment, diaphragm 25 may be constructed from a smooth surfaced sheet of suitable adhesive resistant flat, flexible resilient material. Consequently, the beads provided on the conventional type of diaphragm illustrated in the valve show in FIG. 1, for example, as well as the counterbores or grooves associated with the mating valve parts, may be completely eliminated, greatly reducing the expense and complexity, of the finished valve, particualry the need for a molded diaphragm.

Diaphragm 25 is provided with a central opening 25a through which stem bolt 17 passes. Stem assembly 16 is provided with a disk-like valve element 36, which is positioned within fluid cavity 32. One planar surface of valve element 36 supports the central portion of the adhesive contacting side of diaphragm 25. The other surface 37 of valve element 36 is generally smooth and planar and is configured to mate around its periphery with seating surface 35 so as to form a fluid tight seal therebetween. It will be observed that diaphragm 25 is clamped between valve element 36 and stem bolt head 18 so that the entire valve stem assembly will move with diaphragm 25.

In operation, valve 100 normally assumes the closed position illustrated in FIG. 3 wherein spring 22 operates to urge the valve stem assembly 16 to the left so as to close the fluid passageway between flange 20 and shoulder 4. Consequently, adhesive flow between the inlet and outlet ports is prevented. At the same time, adhesive from a previous valve operation has filled valve inlet chamber 6. In addition, the adhesive, which is normally under a slight dynamic pressure, also flows between surface 37 of valve element 36 and circular rib 34, thereby completely filling fluid cavity 32. Consequently, the entire unsupported portion of diaphragm 25 is in contact with a layer of incompressible liquid, namely the adhesive, along one of its surfaces.

To open the valve, air pressure is applied to inlet 14 which acts against diaphragm 25 to move the diaphragm and attached stem assembly 16 to the opened position. In this mode of operation, adhesive under pressure may flow freely from the fluid inlet port 8, between flange 20 and shoulder 4, and outwardly from outlet port 9. At the same time, valve element 36 is forced into contact with circular rib 34, thereby preventing escape of adhesive from cavity 32 into adhesive inlet chamber 6. Since the adhesive in cavity 32 is restrained, and is substantially incompressible, further deflection or sagging of diaphragm 25 is prevented in its unsupported areas. As a result, the excessive stresses described hereinabove are avoided.

At the same time, contact between valve element 36 and rib 34 serves to limit the reciprocating travel of stem assembly 16. In other words, valve element 36 acts as a stop to limit the amount of stem travel, and thereby controls the amount of clearance between flange 20 and shoulder 4. Consequently, the limits of stem assembly travel are determined by the relationship between valve element 36 and rib 35, rather than by contact between stem top 19 and the cooperating surface of counter bore 31.

When air pressure against the diaphragm is released, spring 22 operates to urge the stem assembly to the left as viewed in FIG. 3 and FIG. 4, returning the valve to the closed position, and again permitting adhesive to enter cavity 32.

It will be understood that various changes in the details, steps, materials and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. In an air pressure actuated fluid control valve of the type incorporating a body portion having an interior cavity, a fluid inlet port for admitting incompressible fluid into the cavity and a fluid outlet port for exhausting incompressible fluid from the cavity, a valve stem reciprocable within the cavity and including valve means for permitting fluid flow between the inlet and outlet ports when the stem is in the opened position and for preventing fluid flow between the inlet and outlet ports when the stem is in the closed position, means for urging said valve means to the closed position, a resilient diaphragm attached to said stem and being substantially unsupported over a portion of its surface, and means for applying air pressure against one major surface of the diaphragm so as to cause the valve stem to move to the opened position, the improvement in combination therewith comprising means for limiting deflection of the unsupported portions of the diaphragm including means for selectively introducing a trapped reservoir of said incompressible fluid derived from said fluid inlet port against the unsupported portion of the opposite major surface of the diaphragm to furnish a restraining force to prevent sagging of the diaphragm when air pressure is applied to the opposite major surface of the diaphragm when the valve is in the opened position.

2. The valve according to claim 1 wherein said introducing means comprises a fluid cavity abutting the unsupported portion of the diaphragm and channel means communicating with the interior cavity of the body portion to permit fluid to enter the fluid cavity when the valve is in the closed position.

3. The valve according to claim 2 wherein said trapping means comprises a valve element connected to said stem and seat means associated with the valve body, said valve element cooperating with the seat means when the valve is in the opened position to prevent the flow of fluid through said channel means.

4. The valve according to claim 3 wherein contact between said valve element and seat means serves as a stop to control the degree of opening of said valve means.

5. An air pressure actuated control valve for controlling the flow of a substantially incompressible liquid adhesive under pressure comprising a housing member having an interior cavity extending longitudinally therethrough to form coaxial fluid, adhesive inlet and adhesive outlet chambers, respectively; an inlet port intersecting and communicating with the inlet chamber for admitting the adhesive to the valve and an outlet port intersecting and communicating with the outlet chamber for exhausting adhesive from the valve; a resilient diaphragm extending completely across said fluid chamber and dividing it into an air inlet chamber abutting one major surface of the diaphragm and a fluid support cavity abutting the other major surface of the diaphragm; an air inlet port for admitting pressurized air into the air inlet chamber; first seating means positioned between said inlet and outlet chambers and second seating means positioned between said inlet chamber and said fluid support cavity; an elongated valve stem reciprocable longitudinally within the interior cavity including means for connecting one end of the stem to the central portion of the diaphragm, first valve element means cooperating with said first seat means to prevent adhesive flow between the inlet and outlet chambers when the stem is in the closed position and to permit adhesive flow between the inlet and outlet chambers when the stem is in an opened position, and second valve element means cooperating with said second seat means for permitting liquid adhesive to enter the fluid support cavity from the adhesive inlet chamber when the stem is in the closed position but preventing escape of the adhesive within the fluid support cavity when the stem is in the opened position thereby forming a reservoir of trapped incompressible adhesive serving to support unsupported parts of the diaphragm to prevent sagging thereof; and spring means for urging the stem to the closed position.

6. The valve according to claim 5 wherein said housing member comprises a body member and a pilot inlet member each having smooth mating surface, said body member including a counterbore forming said fluid support cavity, said pilot inlet having a counterbore forming said air inlet chamber, said diaphragm being held in place arround its peripheral edge by clamping between said mating surfaces.

7. The valve according to claim 6 wherein said diaphragm comprises a smooth surfaced sheet of flexible resilient material.

8. The valve according to claim 7 wherein said first valve element means comprises a flange projecting outwardly from said stem and said first seat means comprises a shoulder extending into the outlet chamber and configured to form a fluid tight seal with said flange.

9. The valve according to claim 8 wherein said second valve element means comprises a disk-like flange extending outwardly from said stem and said second seat means comprises a raised rib formed on the wall of said interior cavity and projecting into said fluid support cavity coaxial with said stem, said rib being configured to form a fluid-tight seal with said disk-like flange.

10. The valve according to claim 9 wherein said second valve element and seat means are configured to form a stop to limit stem travel to control the amount of clearance between said second valve element and seat means.

11. The valve according to claim 10 wherein said spring means comprises a compression spring positioned coaxially with said stem within the outlet chamber.

* * * * *